United States Patent
Broicher et al.

(10) Patent No.: US 12,021,321 B2
(45) Date of Patent: Jun. 25, 2024

(54) CONNECTOR ASSEMBLY FOR INVERTER BUSBAR AND DRIVE UNIT

(71) Applicant: GKN Automotive Limited, Birmingham (GB)

(72) Inventors: Simon Broicher, Hürth (DE); Itziar Ureta, Gipuzkoa (ES); Mehul Parmar, Birmingham (GB); Javier Munoz, Gipuzkoa (ES); Thomas Schepanowski, Cologne (DE); Aitor Tejado, Gipuzkoa (ES)

(73) Assignee: GKN Automotive Limited, Birmingham (GB)

( * ) Notice: Subject to any disclaimer, the term of this patent is extended or adjusted under 35 U.S.C. 154(b) by 432 days.

(21) Appl. No.: 17/423,501

(22) PCT Filed: Feb. 8, 2019

(86) PCT No.: PCT/EP2019/053157
§ 371 (c)(1),
(2) Date: Jul. 16, 2021

(87) PCT Pub. No.: WO2020/160785
PCT Pub. Date: Aug. 13, 2020

(65) Prior Publication Data
US 2022/0077606 A1  Mar. 10, 2022

(51) Int. Cl.
*H01R 9/24* (2006.01)
*H01R 4/30* (2006.01)
(Continued)

(52) U.S. Cl.
CPC .............. *H01R 9/2425* (2013.01); *H01R 4/30* (2013.01); *H02K 5/225* (2013.01); *H02K 11/33* (2016.01); *H02M 7/003* (2013.01)

(58) Field of Classification Search
CPC ........ H01R 9/2425; H01R 4/30; H01R 11/09; H01R 2105/00; H01R 9/226; H02K 5/225; H02K 11/33; H02K 15/14; H02M 7/003
See application file for complete search history.

(56) References Cited

U.S. PATENT DOCUMENTS 5,864,188 A * 1/1999 Gerrand .................... B60S 1/08
  310/71
9,112,397 B2  8/2015 Kobayashi et al.
(Continued)

FOREIGN PATENT DOCUMENTS

JP  2004242472 A  8/2004
JP  2008301544 A  12/2008
(Continued)

OTHER PUBLICATIONS

International Search Report and Written Opinion for PCT/EP2019/053157 mailed Oct. 29, 2019 (10 pages).

*Primary Examiner* — Truc T Nguyen
(74) *Attorney, Agent, or Firm* — Bejin Bieneman PLC

(57) ABSTRACT

Connector assembly for electrically connecting an inverter busbar to an electrical connector of a drive unit comprising: a carrier, an intermediate busbar comprising a first terminal with a hole, and a first fastening element extending through the hole of the first terminal, wherein the intermediate busbar is mounted to the carrier and the intermediate busbar is connectable to the inverter busbar by the first fastening element, wherein the carrier comprises a positioning pin defining a longitudinal axis, said positioning pin being adapted to be accommodated in a receptacle of a housing of the drive unit such that the carrier is axially slidable in the direction of the longitudinal axis; and that the first fastening element is arranged within the hole of the first terminal with (Continued)

a radial clearance relative to the longitudinal axis of the positioning pin.

16 Claims, 6 Drawing Sheets

(51) Int. Cl.
  *H02K 5/22* (2006.01)
  *H02K 11/33* (2016.01)
  *H02M 7/00* (2006.01)

(56) References Cited

U.S. PATENT DOCUMENTS

| | | | |
|---|---|---|---|
| 10,686,261 B2* | 6/2020 | Matsuura | H02G 3/16 |
| 2011/0117784 A1 | 5/2011 | Matsuoka et al. | |
| 2013/0065426 A1* | 3/2013 | Yamashita | H01R 13/6315 |
| | | | 439/449 |
| 2016/0211727 A1* | 7/2016 | Maier | H02K 9/223 |
| 2016/0268875 A1* | 9/2016 | Roos | H02K 5/10 |
| 2016/0322887 A1* | 11/2016 | Koepsell | H05K 1/028 |
| 2017/0179786 A1* | 6/2017 | Goto | H02P 27/06 |
| 2018/0304835 A1 | 10/2018 | Skalski | |
| 2019/0267729 A1* | 8/2019 | Horiuchi | H01R 13/447 |
| 2020/0028403 A1* | 1/2020 | Francis | H01R 43/048 |
| 2020/0106198 A1* | 4/2020 | Seo | H01R 9/24 |
| 2021/0384802 A1* | 12/2021 | Tamura | H02K 3/28 |
| 2021/0399442 A1* | 12/2021 | Yamanashi | H01R 13/521 |
| 2021/0399511 A1* | 12/2021 | Yamanashi | H01R 4/34 |
| 2022/0285897 A1* | 9/2022 | Kumazawa | H01R 25/14 |
| 2022/0416365 A1* | 12/2022 | Baseri | H01M 50/503 |

FOREIGN PATENT DOCUMENTS

| | | |
|---|---|---|
| JP | 2012069261 A | 4/2012 |
| JP | 2017220404 A | 12/2017 |

\* cited by examiner

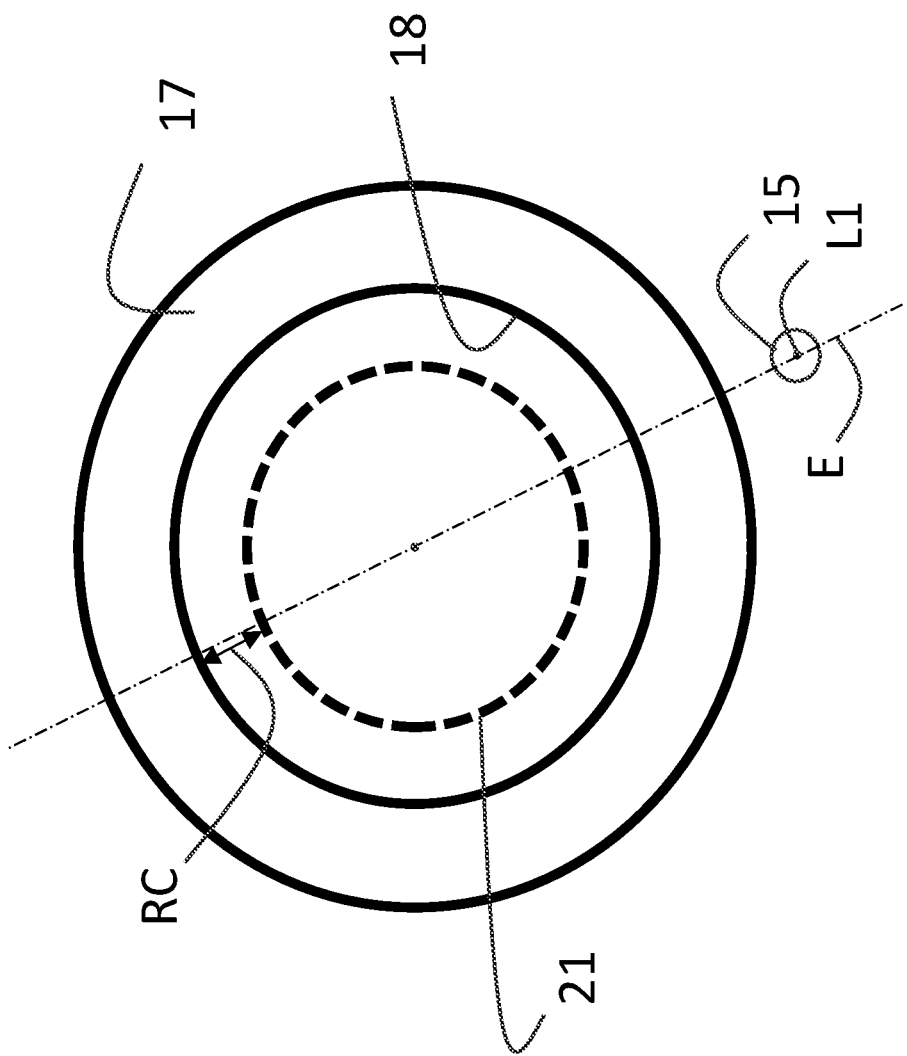

CONNECTOR ASSEMBLY FOR INVERTER BUSBAR AND DRIVE UNIT

CROSS-REFERENCE TO RELATED APPLICATIONS

This application is a national stage of, and claims priority to, Patent Cooperation Treaty Application No. PCT/EP2019/053157, filed on Feb. 8, 2019, which application is hereby incorporated herein by reference in its entirety.

BACKGROUND

Hybrid and full electric vehicles comprise an electric power accumulator, typically a battery, and a motor, to drive the wheels of the vehicle. An inverter is arranged between the electric power accumulator and the motor to converge the accumulated power of the electric power accumulator and to supply the electric power to the motor. In recent times these electric drive units became more integrated to reduce costs and packaging of the drive units. However, even in such configurations, the busbars of the inverter need to be connected to electrical connectors of the motor by an electrical conductor to span the offset of the inverter busbar and the electrical connector of the motor.

A connector assembly as is initially described is disclosed in U.S. Pat. No. 9,112,397 B2. An inverter terminal board mounts an electrical conductor which is formed by a busbar integrally including an inverter site connecting terminal and motor site connecting terminal.

In the U.S. Pat. No. 9,112,397 B2 a second embodiment of a connector assembly is disclosed, wherein an inverter terminal board mounts an electrical conductor which connects an inverter site connecting terminal and motor site connecting terminal by braided wire.

SUMMARY

The present disclosure concerns a connector assembly for electrically connecting an inverter busbar to an electrical connector of a drive unit comprising: a carrier, an intermediate busbar comprising a first terminal with a hole, and a first fastening element extending through the hole of the first terminal, wherein the intermediate busbar is mounted to the carrier and the intermediate busbar is connectable to the inverter busbar by the first fastening element. The provided connection of an inverter busbar to an electrical connector of a drive unit can span the nominal offset between the inverter busbar and the electrical connector that compensates for position deviations between the inverter busbar and the electrical connector while reducing static loads of the inverter busbar and is resilient to vibrations.

A connector assembly for electrically connecting an inverter busbar to an electrical connector of a drive unit comprises: a carrier, an intermediate busbar comprising a first terminal with a hole, and a first fastening element extending through the hole of the first terminal, wherein the intermediate busbar is mounted to the carrier and the intermediate busbar is connectable to the inverter busbar by the first fastening element, wherein the carrier comprises a positioning pin defining a longitudinal axis, said positioning pin being adapted to be accommodated in a receptacle of a housing of the drive unit such that the carrier is axially slidable in the direction of the longitudinal axis; and the first fastening element is arranged within the hole of the first terminal with a radial clearance relative to the longitudinal axis of the positioning pin.

The connector assembly has the advantage that the position deviations between the inverter busbar and the electrical connector can be compensated without the use of wires. Wires are vulnerable to vibrations induced for example from the drive unit itself or by vehicle movement limiting the lifetime of the connector assembly. Furthermore, the connector assembly induces no static loads on the inverter busbar after connecting the intermediate busbar to the inverter busbar. Tensioning of the inverter busbar in a direction parallel to the longitudinal axis of the positioning pin is avoided by the slidable arrangement of the positioning pin respectively the carrier. Tensioning of the inverter busbar in a direction radial to the longitudinal axis of the positioning pin is avoided through the radial clearance between the first fastening element and the hole of the first terminal. Furthermore, additional external loads on the connector assembly such as vibrations will be borne by the positioning pin.

In the context of the present disclosure a radial clearance relative to the longitudinal axis of the positioning pin between the first fastening element and the hole of the first terminal shall be understood to include any clearance between the first fastening element and the hole of the first terminal in a plane extending radially to the longitudinal axis of the positioning pin.

In the context of the present disclosure a busbar is meant to include an electrically conductive strip or bar that can be considered as reasonably stiff, in particular as stiff compared to a wire. Furthermore, a hole shall be understood to mean any opening extending through an element, wherein the opening can have a closed profile such as a bore or an open profile in a radial direction relative to a longitudinal axis of the hole such as a slot or a recess.

Moreover, the locating pin can have any cross-sectional profile that allows the locating pin to slide inside a receptacle along its longitudinal axis. For example, the locating pin can have a round, oval or rectangular cross-sectional profile. It is also conceivable that the cross-sectional profile of the locating pin is crescent-shaped or has a shape of a curved rectangular. The span from one end of the cross-sectional profile to another end can be larger than the extent of the locating pin in the direction of the longitudinal axis.

To compensate analytically determined maximum position deviations between the inverter busbar and the electrical connector of the drive unit, the nominal radial clearance of the first fastening element and the hole of the first terminal can be for example 1 mm (millimeter) or more.

The connector assembly can be configured to connect one or more inverter busbars to one or more electrical connectors. In particular, the connector assembly can be configured to connect three inverter busbars to three electrical connectors via three intermediate busbars.

In case the connector assembly is configured to connect at least two inverter busbars to two electrical connectors the carrier can comprise a rib or ribs configured to separate two adjacent intermediate busbars, respectively two adjacent electrical connectors, and/or two inverter busbars from each other.

The carrier can be made at least partially form an electrical insulating material to avoid any short-circuits between the intermediate busbars and/or the inverter busbars.

In an embodiment the connector assembly can comprise a second fastening element and the intermediate busbar can have a second terminal with a hole, wherein the second fastening element extends through the hole of the second terminal for establishing a connection between the intermediate busbar and the electrical connector of the drive unit. In this embodiment the carrier can comprise a threaded bore receiving the second fastening element. For this, the carrier can comprise a threaded insert provided with said threaded bore made of an electrically conductive material. In addition or alternatively, the threaded insert of the carrier can be made of a metallic material to avoid unwanted loosening of the fastening elements.

Furthermore, the second fastening element can be arranged within the hole of the second terminal of the intermediate busbar with a clearance in a direction parallel to the longitudinal axis of the positioning pin. In this way tensioning between the intermediate busbar and the electrical connector of the drive unit in a direction parallel to the longitudinal axis of the positioning pin can be avoided. Moreover, the second fastening element can be arranged within the hole of the second terminal of the intermediate busbar with a clearance at least in a direction perpendicular to the longitudinal axis of the positioning pin.

In a further embodiment the carrier can comprise an insert with a hole made of an electrically conductive material, wherein the first fastening element is arranged inside the hole of the insert and the insert is in contact with the first fastening element and the intermediate busbar. With this embodiment the current from the inverter busbar can be transmitted to the intermediate busbar with a sufficiently low contact resistance. In addition or alternatively, the insert of the carrier can be made of a metallic material to avoid unwanted loosening of the fastening elements.

In another embodiment the connector assembly can further comprise a third fastening element, wherein the carrier can have a hole and the carrier is connectable to the housing of the drive unit by the third fastening element extending through the hole of the carrier, wherein the third fastening element is arranged within the hole of the carrier with a clearance in a direction parallel to the longitudinal axis of the positioning pin. Mounting the carrier onto the housing of the drive unit prevents the connector assembly from oscillating, for example due to the excitation from the motor or from the vehicle body movement. Furthermore, with this embodiment it can be avoided that further external loads acting in a direction parallel to the longitudinal axis of the positioning pin on the inverter busbars via the carrier are induced while mounting the carrier onto the housing of the drive units. To compensate for maximum position deviations between the inverter busbar and the electrical connector of the drive unit, the nominal clearance in a direction parallel to the longitudinal axis of the positioning pin between the third fastening element and the hole of the carrier can be for example 2 mm and more. Furthermore, the third fastening element can be arranged within the hole of the carrier with a clearance at least in a direction perpendicular to the longitudinal axis of the positioning pin. For example, the clearance can be chosen by considering standardized clearances for the third fastening element.

For instance, the hole of the carrier can have an elongated shape or it can be a slot open in a direction parallel to the longitudinal axis of the positioning pin.

Included in the present disclosure is a drive unit comprising: a housing with a receptacle, an inverter busbar for an electrical connection with an inverter, an electrical connector for an electrical connection with an electrical load, and a connector assembly according to any one of the preceding claims, wherein the positioning pin is accommodated within the receptacle of the housing, slidable in an axial direction, and the intermediate busbar is connected to the inverter busbar by the first fastening element.

The drive unit shows the same advantages as the inventive connector assembly alone. Therefore, reference is made here to the related explanation above.

The axial direction in which the positioning pin is slidable accommodated within receptacle of the housing is parallel to the longitudinal axis of the positioning pin.

The receptacle of the housing has a cross-sectional profile that allows the positioning pin to slide inside the receptacle along the longitudinal axis of the positioning pin. In particular, the cross-sectional profile of the receptacle is complementary to the cross-sectional profile of the locating pin. In particular, the cross-sectional profile of the receptacle can be round, oval, rectangular, crescent-shaped or can have a shape of a curved rectangle.

In an embodiment of the drive unit the intermediate busbar can be connected to the electrical connector by the second fastening element. Thus, a fixed connection between the intermediate busbar and the electrical connector can be established to avoid significant relative motion between these two parts.

In another embodiment of the drive unit the electrical connector can comprise a hole through which the second fastening element extends, wherein the second fastening element is arranged within the hole of the electrical connector with a clearance in a direction parallel to the longitudinal axis of the positioning pin. With this embodiment it can be avoided that a tension force in parallel to the longitudinal axis of the positioning pin resulting from the connection between the electrical connector and the intermediate busbar is acting on the inverter busbar via the carrier. To compensate for maximum position deviations between the inverter busbar and the electrical connector of the drive unit, the nominal clearance in a direction parallel to the longitudinal axis of the positioning pin between the third fastening element and the hole of the carrier can be for example 1 mm or more. Furthermore, the second fastening element can be arranged within the hole of the electrical connector with a clearance in a direction perpendicular to the longitudinal axis of the positioning pin.

In an embodiment of the drive unit the carrier can be connected to the housing by a third fastening element extending through a hole of the carrier, wherein a clamping force of the third fastening element is acting in a direction transversely to the longitudinal axis of the positioning pin. In particular, the clamping force can act in a direction so that a self-locking connection between the carrier and the housing is established, i.e., the friction force in the contact between carrier and housing induced by the clamping force exceeds the axial component of the clamping force. With this embodiment it can be avoided that while fastening of the carrier to the housing a force parallel to the longitudinal axis of the positioning pin is acting on the inverter busbar via the carrier.

In a further embodiment the drive unit can comprise a planar contact between the electrical connector and the intermediate busbar and/or a planar contact between the inverter busbar and the intermediate busbar. With this embodiment the current from the inverter busbar can be transmitted to the electrical connector via the intermediate busbar with a sufficiently low contact resistance.

In an embodiment of the drive unit the first fastening element can be a first screw received by a threaded bore of the inverter busbar or by a nut. In another embodiment of the drive unit the second fastening element is a second screw received by the threaded bore of the carrier clamping the electrical connector between the intermediate busbar and the carrier.

The present disclosure further includes a method for electrically connecting an inverter busbar to an electrical connector of a drive unit by a connector assembly, in particular by a connector assembly as described above, comprising the following steps: mounting a carrier with an intermediate busbar onto a housing such that the carrier is slidable in a first direction; bringing the intermediate busbar into contact with the inverter busbar by sliding the carrier in the first direction; fastening the intermediate busbar to the inverter busbar; and fastening the intermediate busbar to the electrical connector of the drive unit.

An advantage is that the intermediate busbar can be connected to the inverter busbar without applying static loads on the inverter busbar.

An embodiment can comprise the further step of positioning the electrical connector of the drive unit between the carrier and the intermediate busbar while mounting the carrier onto the housing.

Another embodiment can comprise the further step of fastening the carrier to the housing after fastening the intermediate busbar to the electrical connector of the drive unit.

BRIEF SUMMARY OF THE DRAWINGS

Below, examples are described with reference to the accompanying Figures, wherein:

FIG. 6 is a schematic view of a first screw extending through a hole in the first terminal with a radial clearance relative to the longitudinal axis of the positioning pin.

DESCRIPTION

Figure 1:
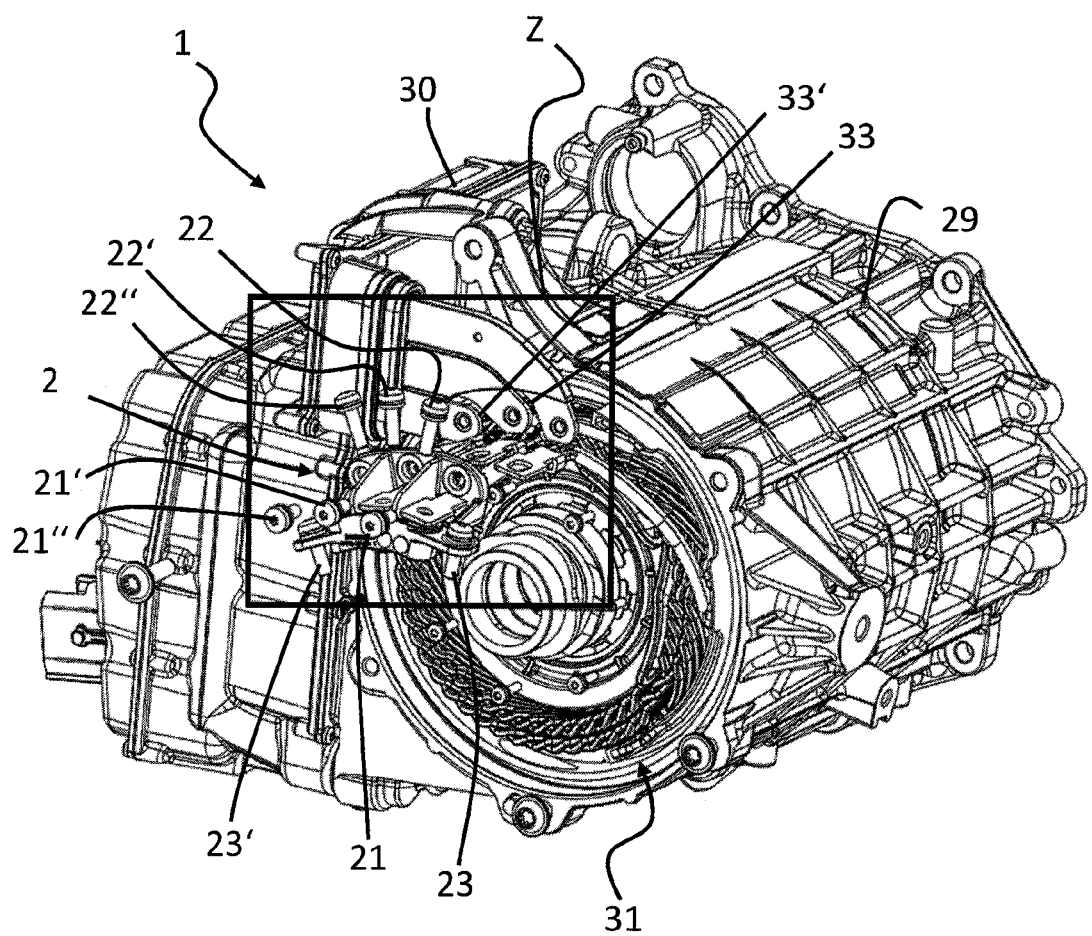
FIG. 1 is an exploded view of a drive unit with a connector assembly with the housing partially cut out.
Figure 2:
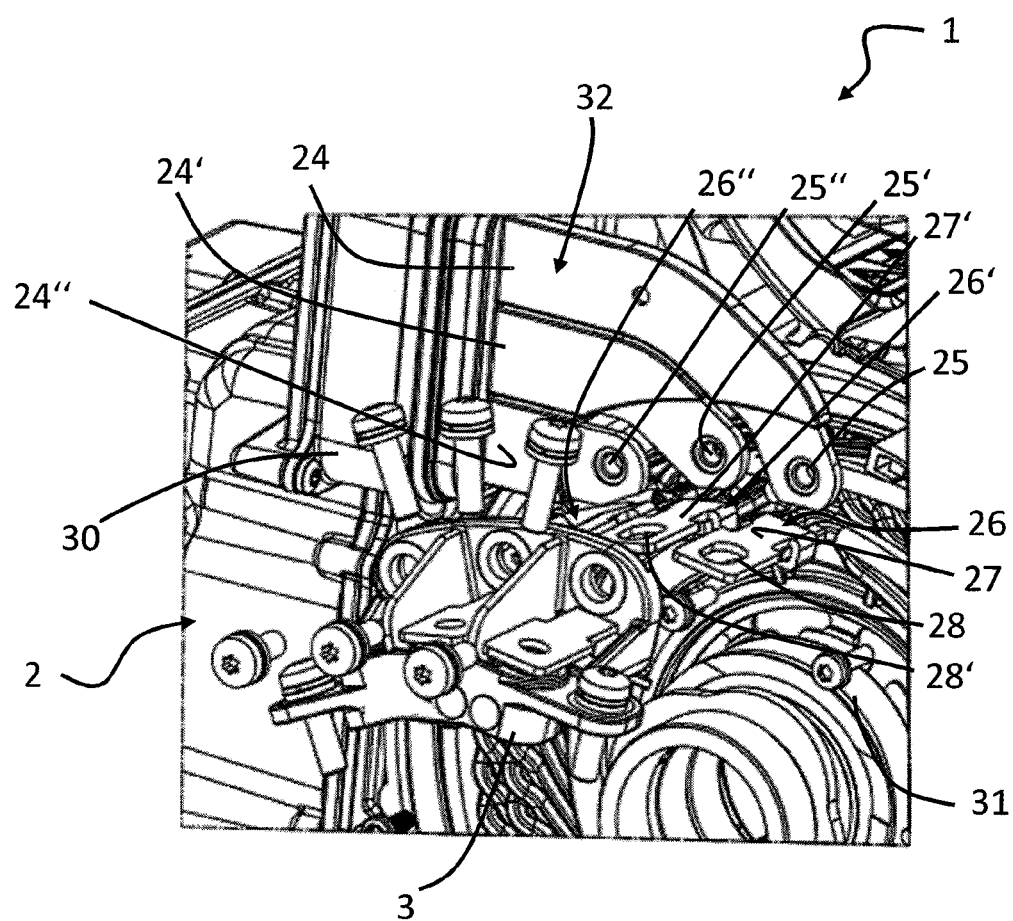
FIG. 2 is a scaled-up view of the detail Z of FIG. 1.
Figure 3:
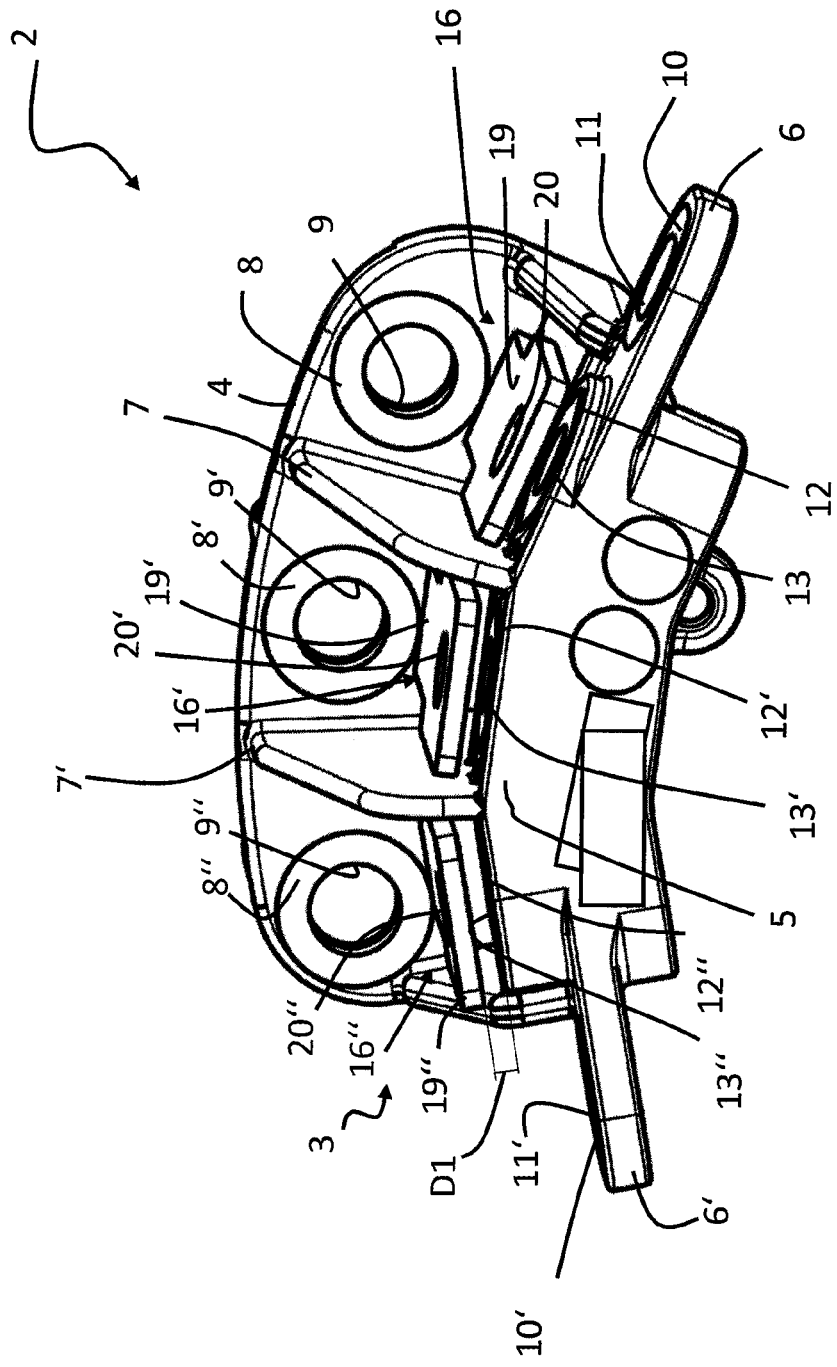
FIG. 3 is a first perspective detail view of the connector assembly of the drive unit of FIG. 1.
Figure 4:
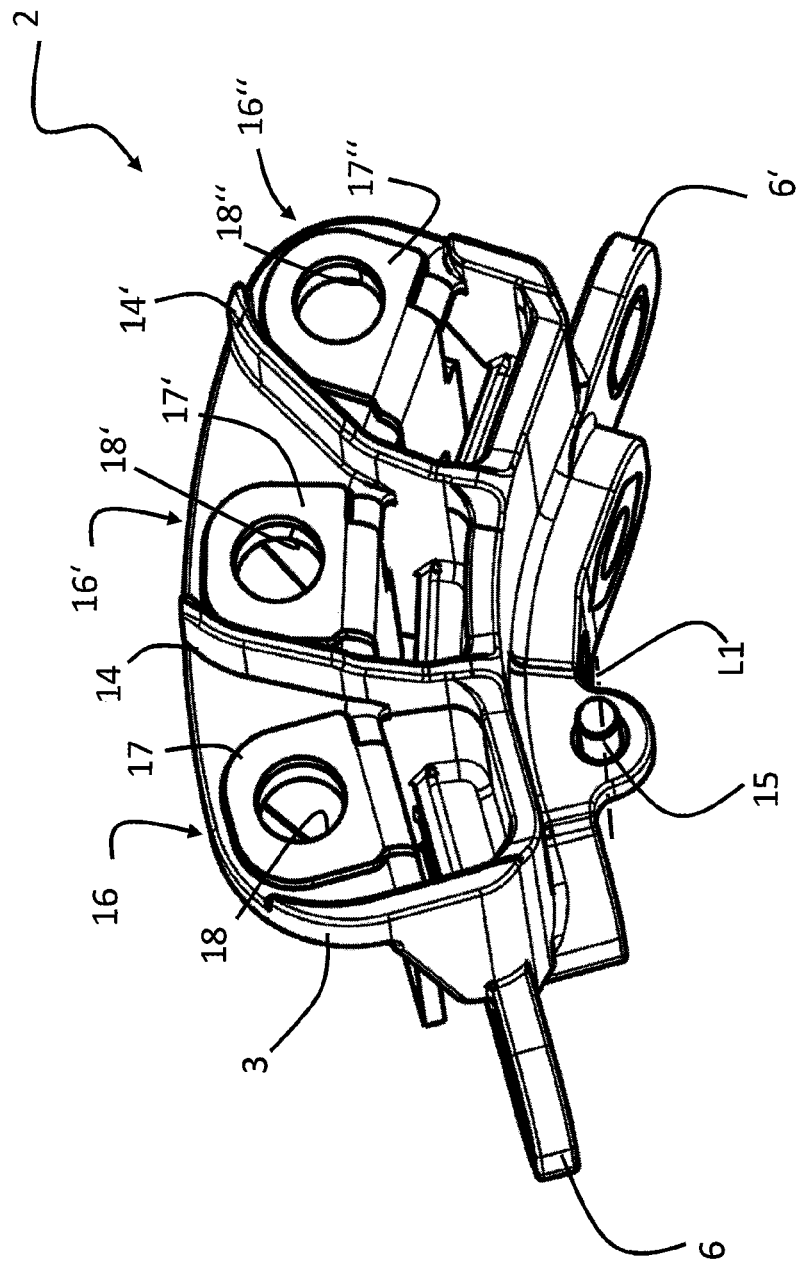
FIG. 4 is a second perspective detail view of the connector assembly of the drive unit of FIG. 1.

FIGS. 1 to 4 depict an exemplary embodiment of a connector assembly 2 connecting inverter busbars 24, 24', 24" to motor connectors 26, 26', 26" of an electrical drive unit 1.

The electrical drive unit 1 comprises an inverter 30 transmitting electrical power of a battery that is not represented in the Figures to an electrical motor 31. The inverter 30 includes three inverter busbars 24, 24', 24" for connecting the inverter 30 to the electrical load, wherein each of the inverter busbars 24, 24', 24" is representing one electrical phase.

The inverter busbars 24, 24', 24" have a flat shape in the present embodiment. However, also shapes divergent from flat can be conceived for the busbars 24, 24', 24". The three inverter busbars 24, 24', 24" are separated and electrically insulated to each other by an insulating cover 32. At a free end, where no insulating cover is present, each of the inverter busbars 24, 24', 24" is provided with a threaded bore 25, 25', 25" to connect the inverter busbars 24, 24', 24" to a connector assembly 2.

The electric motor 31 comprises three motor connectors 26, 26', 26" for connecting the electric motor 31 to an electric power source, which is in the present embodiment the battery. Each of the motor connectors 26, 26', 26" includes a terminal 27, 27' that has a flat rectangular shape in the present embodiment. However, also shapes divergent from flat or rectangular can be conceived for the terminals 27, 27'. Each of the terminals 27, 27' comprises an elongated through-hole 28, 28'. In the Figures the terminal including the through-hole of the motor connector 26" are concealed. A slot open to an end portion of the motor connectors 26, 26', 26" is also possible.

The inverter busbars 24, 24', 24" are connected to the motor connectors 26, 26', 26" by the connector assembly 2 including the carrier 3 and three intermediate busbars 16, 16', 16".

The carrier 3 of the connector assembly 2 is made at least partly out of an electrically insulating material and includes a first connecting portion 4 and a second connecting portion 5 that are arranged perpendicular to each other. Two stiffening ribs 7, 7' extend between the first connecting portion 4 and the second connecting portion 5 to reinforce the carrier and spatially separate the three intermediate busbars 16, 16', 16" from each other.

The carrier 3 further comprises a positioning pin 15 defining a longitudinal axis L1. The positioning pin 15 is accommodated in a receptacle of the housing 29, which is not seen in the Figures, such that the carrier 3 is slidable in a direction parallel to the longitudinal axis L1. External loads acting on the carrier 3 transversely to the longitudinal axis L1 will be beard by the positioning pin 15. In the present embodiment the positioning pin 15 has a round profile along the longitudinal axis L1. However, all other profiles that allow the positioning pin 15 to slide in a receptacle of the housing 29 along the longitudinal axis L1 are conceivable, e.g. oval, rectangular, crescent-shaped or curved-rectangular-shaped. In this regard, the receptacle of the housing 29 can have a complimentary shape relative to the shape of the positioning pin 15. The positioning pin 15 and the receptacle of the housing 29 can be formed so that a loose fit or transition fit is established between the positioning pin 15 and the receptacle of the housing 29.

The intermediate busbars 16, 16', 16" are mounted to the first connecting portion 4 of the carrier 3 such that they are fixed in the plane outlined by the first connecting portion 4 and slidable perpendicular to said plane. Each of the intermediate busbars 16, 16', 16" comprises a first terminal 17, 17', 17" that has in the present embodiment a flat shape complimentary to the shape of the inverter busbars 24, 24', 24". Hereby, a planar contact between the first terminals 17, 17', 17" of the intermediate busbars 16, 16', 16" and the inverter busbars 24, 24', 24" is ensured reducing the electrical contact resistance. To fix the intermediate busbars 16, 16', 16" to the inverter busbars 24, 24', 24", first fastening elements in the form of first screws 21, 21', 21" extend through holes 9, 9', 9" in inserts 8, 8', 8" of the carrier 3. Further, the first screws 21, 21', 21" extend through holes 18, 18', 18" in the first terminals 17, 17', 17" of the intermediate busbars 16, 16', 16" with a radial clearance RC relative to the longitudinal axis L1 of the positioning pin 15. The radial clearance RC relative to the longitudinal axis L1 of the positioning pin 15 between the first screws 21, 21', 21" and the respective holes 18, 18', 18" of the first terminals 17, 17', 17" is the clearance between the first screws 21, 21', 21" and the respective holes 18, 18', 18" of the first terminals 17, 17', 17" in a plane E extending radially to the longitudinal axis L1 of the positioning pin 15. The first screws 21, 21', 21" are accommodated in the threaded bores 25, 25', 25" of the inverter busbars 24, 24', 24" clamping the first terminals 17, 17', 17" of the intermediate busbars 16, 16', 16" in between the first connecting portion 4 of the carrier 3 and the inverter busbars 24, 24', 24". Due to the radial clearance RC between the holes 18, 18', 18" in the first terminals 17, 17', 17" of the intermediate busbars 16, 16', 16" and the first screws 21, 21', 21" as well as the slidable arrangement of the positioning pin 15 within the receptacle of the housing 29 position deviations between the inverter busbars 24, 24', 24" and the receptacle of the housing 29 can be compensated for so that no static loads are applied to the inverter busbars 24, 24', 24" by connecting the intermediate busbar 16, 16', 16" to the inverter busbars 24, 24', 24".

The holes 9, 9', 9" of the inserts 8, 8', 8" and the holes 18, 18', 18" in the first terminals 17, 17', 17" have the same diameter in the present embodiment. However, it is conceivable that the diameters of the holes 9, 9', 9" of the inserts 8, 8', 8" and the holes 18, 18', 18" of the terminals 17, 17', 17" differ. In particular, the diameter of the holes 9, 9', 9" of the inserts 8, 8', 8" can be larger than the diameter of the holes 18, 18', 18" of the first terminals 17, 17', 17".

The inserts 8, 8', 8" can be made of an electrically conductive material to reduce the electrical contact resistance of the connection of the inverter busbars 24, 24', 24" and the intermediate busbars 16, 16', 16". In addition or alternatively, the inserts 8, 8', 8" can be made of a metallic material to avoid unwanted loosening of the first fastening elements 21, 21', 21".

The carrier 3 further comprises two guiding ribs 14, 14' that also can be called separation ribs. In assembled condition the first guiding rib 14 is received in a first gap 33 and the second guiding rib 14' is received in a second gap 33', wherein the first gap 33 is constituted by the free ends of the inverter busbar 24 and the inverter busbar 24' and second gap 33' is constituted inverter busbar 24' and the inverter busbar 24". Therefore, while sliding the positioning pin 15 or the carrier 3 along the longitudinal axis L1 the guiding ribs 14, 14' guide the carrier 3 into a dedicated position before connecting the intermediate busbars 16, 16', 16" to the inverter busbar 24, 24', 24". Furthermore, the guiding ribs 14, 14' spatially separate as well as electrically insulate the inverter busbars 24, 24', 24" from each other.

Further, each of the intermediate busbars 16, 16', 16" comprises a second terminal 19, 19', 19" that has in the present embodiment a flat rectangular shape complimentary to the shape of the related terminal 27, 27' of the motor connectors 26, 26', 26". Therefore, a shape of the second terminals 19, 19', 19" that is diverging from flat or rectangular is also possible. The second terminals 19, 19', 19" of the intermediate busbars 16, 16', 16" are arranged perpendicular to the first terminals 17, 17', 17" of the intermediate busbars 16, 16', 16" and parallel to the second connecting portion 5 of the carrier 3. The second connecting portion 5 of the carrier 3 and the second terminals 19, 19', 19" of the intermediate busbars 16, 16', 16" are separated by the distance D1 defining a slot in which the terminals 27, 27' of the motor connectors 26, 26', 26" are arranged.

Second fastening elements in the form of second screws 22, 22', 22" are accommodated in threaded bores 13, 13', 13" of inserts 12, 12', 12" which are included in the carrier 3. The second screws 22, 22', 22" extend through holes 20, 20', 20" in the second terminals 19, 19', 19" of the intermediate busbars 16, 16', 16" and the elongated through-holes 28, 28' of the terminals 27, 27' of the motor connectors 26, 26', 26". The screw force of the second screws 22, 22', 22" is clamping the motor connectors 26, 26', 26" between the second connecting portion 5 of the carrier 3 and the intermediate busbars 16, 16', 16".

In assembled condition the elongated through-holes 28, 28' of the terminals 27, 27' extend in a direction parallel to the longitudinal axis L1 of the positioning pin 15. Thus, the second screws 22, 22', 22" are arranged within the elongated through-holes 28, 28' with a clearance in the direction of the longitudinal axis L1 of the positioning pin 15. Therefore, no static loads in the direction of the longitudinal axis L1 are applied to the inverter busbars 24, 24', 24" via the carrier 3 by connecting the intermediate busbars 16, 16', 16" with the motor connectors 26, 26', 26".

The carrier 3 further includes two fixation portions 6, 6' each including an insert 10, 10'. The inserts 10, 10' comprise holes 11, 11' through which third fastening elements in the form of third screws 23, 23' extend. The third screws 23, 23' are accommodated in threaded bores of the housing 29. Hereby, the carrier 3 is secured to the housing 29 reducing vibrations induced from any source of the drive unit 1. The threaded bores of the housing 29 are located in the part of the housing 29 cut out in FIGS. 1 and 2.

The holes 11, 11' have an elongated shape extending parallel to the longitudinal axis L1 of the positioning pin 15 in the present embodiment. However, all shapes of the holes 11 are conceivable that realise a clearance in a direction parallel to the longitudinal axis L1 of the positioning pin 15 between the holes 11, 11' and the third screws 23, 23'.

The connector assembly 2 and the motor 31 are covered by a housing cover connected to the housing 29 to protect the electrical connection from environmental influences. For the sake of transparency the housing cover is not depicted in the FIGS. 1 to 4.

Figure 5:
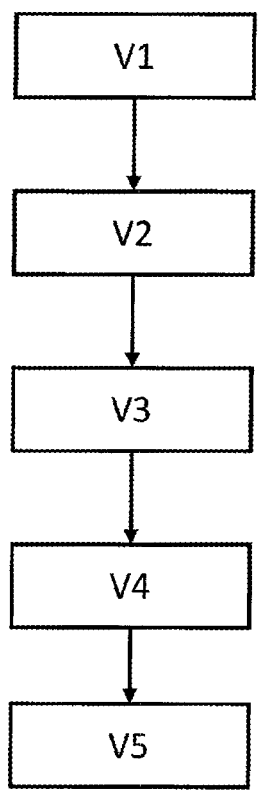
FIG. 5 is a process diagram of a method for electrically connecting an inverter busbar to an electrical connector of a drive unit by a connector assembly.

In FIG. 5 a process sequence of a method for electrically connecting an inverter busbar to an electrical connector of a drive unit by a connector assembly. In a first process step V1 the carrier 3 (see FIGS. 1 to 4) including an intermediate busbar 16, 16', 16" is mounted onto a housing 29 such that the carrier 3 is slidable in a first direction. While mounting the carrier 3 onto the housing 29 the electrical connector 26, 26', 26" of the drive unit 1 is positioned between the carrier 3 and the intermediate busbar 16, 16', 16". In a second process step V2 the intermediate busbar 16, 16', 16" is brought into contact with the inverter busbar 24, 24', 24" by sliding the carrier in the first direction. In the subsequent process step V3 the intermediate busbar 16, 16', 16" is fastened to the inverter busbar 24, 24', 24". In the fourth process step V4 the intermediate busbar 16, 16', 16" is fastened to the electrical connector of the drive unit 1. In a fifth process step V5 the carrier 3 is fastened to the housing 29.

LIST OF REFERENCE SIGNS 1 drive unit
2 connector assembly
3 carrier
4 connecting portion
5 connecting portion
6, 6' fixation portion
7, 7' stiffening rib
8, 8', 8" insert
9, 9', 9" hole
10, 10' insert
11, 11' hole
12, 12', 12" insert
13, 13', 13" threaded bore
14, 14' guiding rib
15 positioning pin
16, 16', 16" intermediate busbar
17, 17', 17" first terminal
18, 18', 18" hole 19, 19', 19" second terminal
20, 20', 20" hole
21, 21', 21" screw
22, 22', 22" screw
23, 23' screw
24, 24', 24" inverter busbar
25, 25', 25" threaded bore
26, 26', 26" motor connector
27, 27' terminal
28, 28' hole
29 housing
30 inverter
31 motor
32 cover
33, 33' gap
D distance
L longitudinal axis

The invention claimed is:

1. A connector assembly for electrically connecting an inverter busbar to an electrical connector of an electric motor of a drive unit, comprising:
a carrier,
an intermediate busbar including a first terminal with a hole, and a first fastening element extending through the hole of the first terminal,
wherein the intermediate busbar is mounted to the carrier and the intermediate busbar is connectable to the inverter busbar by the first fastening element,
wherein the carrier includes a positioning pin defining a longitudinal axis, said positioning pin being adapted to be accommodated in a receptacle of a housing of the drive unit such that the carrier is axially slidable in the direction of the longitudinal axis; and
wherein the first fastening element is arranged within the hole of the first terminal with a radial clearance relative to the longitudinal axis of the positioning pin.

2. The connector assembly of claim 1,
wherein the connector assembly further comprises a second fastening element,
wherein the intermediate busbar has a second terminal with a hole, and
wherein the second fastening element extends through the hole of the second terminal for establishing a connection between the intermediate busbar and the electrical connector of the drive unit.

3. The connector assembly of claim 2, wherein the carrier includes a threaded bore receiving the second fastening element.

4. The connector assembly of claim 1, further comprising a third fastening element,
wherein the carrier has a hole, and
wherein the carrier is connectable to the housing of the drive unit by the third fastening element extending through the hole of the carrier,
wherein the third fastening element is arranged within the hole of the carrier with a clearance in a direction parallel to the longitudinal axis of the positioning pin.

5. The connector assembly of claim 4, wherein the third fastening element is arranged within the hole of the carrier with a clearance in a direction perpendicular to the longitudinal axis of the positioning pin.

6. A drive unit comprising:
a housing with a receptacle,
an inverter busbar for an electrical connection with an inverter,
an electrical connector for an electrical connection with an electrical load, and
a connector assembly including
a carrier,
an intermediate busbar including a first terminal with a hole, and a first fastening element extending through the hole of the first terminal,
wherein the intermediate busbar is mounted to the carrier and the intermediate busbar is connectable to the inverter busbar by the first fastening element,
wherein the carrier includes a positioning pin defining a longitudinal axis, said positioning pin being adapted to be accommodated in a receptacle of a housing of the drive unit such that the carrier is axially slidable in the direction of the longitudinal axis; and
wherein the first fastening element is arranged within the hole of the first terminal with a radial clearance relative to the longitudinal axis of the positioning pin,
wherein:
the positioning pin is accommodated within the receptacle of the housing, slidable in an axial direction, and
the intermediate busbar is connected to the inverter busbar by the first fastening element.

7. The drive unit of claim 6, wherein the intermediate busbar is connected to the electrical connector by the second fastening element.

8. The drive unit of claim 6, wherein the first fastening element is a first screw received by a threaded bore of the inverter busbar or by a nut.

9. The drive unit of claim 6, wherein the electrical connector comprises a hole through which the second fastening element extends, wherein the second fastening element is arranged within the hole of the electrical connector with a clearance in a direction parallel to the longitudinal axis of the positioning pin.

10. The drive unit of claim 9, wherein the second fastening element is arranged within the hole of the electrical connector with a clearance in a direction perpendicular to the longitudinal axis of the positioning pin.

11. The drive unit of claim 6, wherein the second fastening element is a second screw received by the threaded bore of the carrier clamping the electrical connector between the intermediate busbar and the carrier.

12. The drive unit of claim 6, including a planar contact between the electrical connector and the intermediate busbar and/or between the inverter busbar and the intermediate busbar.

13. The drive unit of claim 6, wherein the carrier is connected to the housing by a third fastening element extending through a hole of the carrier, wherein a clamping force of the third fastening element acts in a direction transversely to the longitudinal axis of the positioning pin.

14. A method for electrically connecting an inverter busbar to an electrical connector of a drive unit by a connector assembly that includes a carrier, an intermediate busbar including a first terminal with a hole, and a first fastening element extending through the hole of the first terminal, wherein the intermediate busbar is mounted to the carrier and the intermediate busbar is connectable to the inverter busbar by the first fastening element, wherein the carrier includes a positioning pin defining a longitudinal axis, said positioning pin being adapted to be accommodated in a receptacle of a housing of the drive unit such that the carrier is axially slidable in the direction of the longitudinal axis; and wherein the first fastening element is arranged within the hole of the first terminal with a radial clearance relative to the longitudinal axis of the positioning pin, the method comprising:

mounting a carrier with an intermediate busbar onto a housing such that the carrier is slidable in a first direction;

bringing the intermediate busbar into contact with the inverter busbar by sliding the carrier in the first direction;

fastening the intermediate busbar to the inverter busbar; and fastening the intermediate busbar to the electrical connector of the drive unit.

15. The method of claim 14, further comprising positioning the electrical connector of the drive unit between the carrier and the intermediate busbar while mounting the carrier onto the housing.

16. The method of claim 14, further comprising fastening the carrier to the housing after fastening the intermediate busbar to the electrical connector of the drive unit.

\* \* \* \* \*